C. DE SEDNEFF.
ELECTRIC ACCUMULATOR.
APPLICATION FILED JULY 28, 1913.
1,213,467.
Patented Jan. 23, 1917.
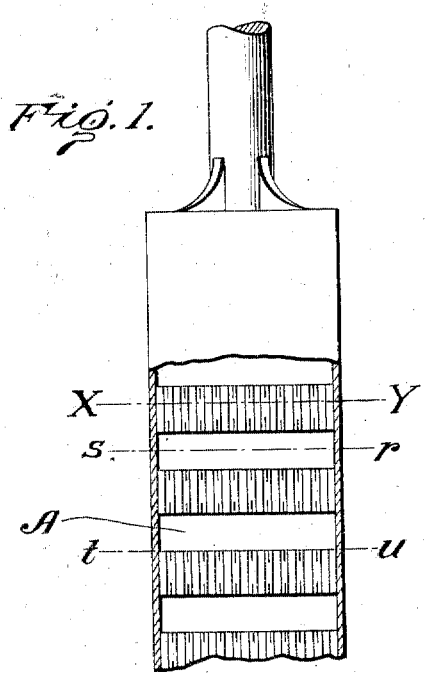
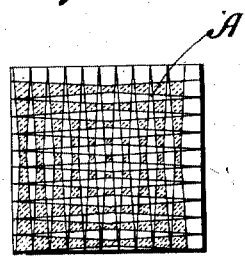
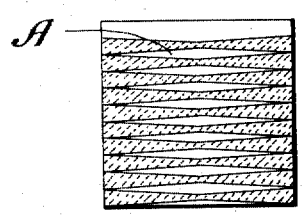
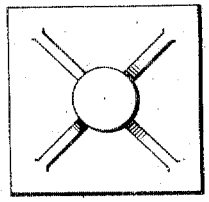
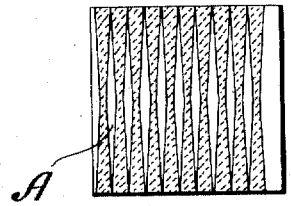
Inventor
Constantine de Sedneff,
By
B. Singer, Attorney

UNITED STATES PATENT OFFICE.

CONSTANTIN DE SEDNEFF, OF PARIS, FRANCE.

ELECTRIC ACCUMULATOR.

1,213,467.

Specification of Letters Patent.

Patented Jan. 23, 1917.

Application filed July 28, 1913. Serial No. 781,593.

*To all whom it may concern:*

Be it known that I, CONSTANTIN DE SEDNEFF, a subject of the Emperor of Russia, residing at Paris, France, have invented certain new and useful Improvements in Electric Accumulators, of which the following is a full, clear, and exact specification.

My invention relates to electric accumulators and has as its principal object the provision of electrodes having a very large active surface per unit weight combined with high rigidity and permeability toward the electrolyte.

A second object of my invention is to provide an electrode in which the difference of potential between the parts of the active mass which are in contact shall be as small as possible.

A final object of my invention resides in the particular arrangement and combination of parts hereinafter described.

In the accompanying drawings: Figure 1 is an elevational view of an electrode constructed according to my invention, parts being broken away. Fig. 2 is a cross-sectional view on the line $t$—$u$ of Fig. 1 and showing one series of cells as superimposed upon series just below it. Fig. 3 is a cross-section on the line $s$—$r$ of Fig. 1. Fig. 4 is a cross section on the line $x$—$y$ of Fig. 1. Fig. 5 is a top plan view of Fig. 1.

Referring more particularly to the drawing, 1 is the outer shell of the electrode, the opposite faces of which are connected by means of horizontal layers of webs, which may be of any desired cross-section. A web having one form of cross-section is shown at A. The spaces G intermediate the metal webs are filled by active material and this material may be introduced as paste or formed in place by electrolytic action. It will be understood that the webs in adjacent layers are shown crossing each other at right angles, although the particular angle is not essential. The webs in a given horizontal plane or layer are spaced apart to form cells or apertures for containing the active material as indicated at G. A given horizontal layer of webs or bars with its interposed quantities of active material is superposed above another horizontal layer similar to the first only having the webs or bars at an angle to those in the first in the manner in which cord wood might be piled up into a stack having layers of sticks at right angles one above the other. It will be understood, of course, that the webs or bars in the different horizontal layers are connected at the points where they cross the webs or bars in the layers above and below so that the entire structure is held together. It will be apparent, moreover, that the active material should be traversed uniformly by the current. In order to obtain this result, in the type of electrode just described, I form the bars or webs of greater cross-section near the center of the electrode. This arrangement is clearly shown in Figs. 3 and 4, where the bars evidently taper from the center outwardly. The central portion of the electrode thus contains more metal in proportion to its distance from the outer surface and the electrical resistance of the central portion of the electrode is thus decreased sufficiently so that current entering the surface of the electrode from the electrolytes at any point may pass to the top connection for the electrode as readily through the central portion thereof as through the portions nearer the surface, the decreased resistance of the central portions compensating for the resistance encountered by the current in passing from the surface of the electrode to the central portion thereof. The result is that current entering the electrode from the electrolytes for passing from the electrode to the electrolytes is distributed uniformly throughout the cross section of the electrode and the active material is consequently acted on uniformly by the current. Moreover, the distribution of metal, and consequently, the resistance changes uniformly from the surface inwardly, points on a horizontal line parallel to the surface being at the same potential. This fact also has an important effect in producing a stable and uniform distribution of current throughout the entire cross-section of the electrode, since there is no flow of current in the directions having a horizontal component parallel to the surface. The current passing through a given piece of active material is consequently uniform and the difference of potential between different parts of the active material varies uniformly and consequently there is no local action or discharge between different portions of the active material. It will be obvious moreover, that the horizontal section of the electrode may be of any convenient form without affecting the application of my invention thereto.

Having thus described my invention, I claim:—

An electrode for accumulators comprising superimposed layers of webs extending from one side of the electrode to the other, adjacent webs having a cell therebetween, and the webs of adjacent layers being set at angles, the individual webs tapering from the center of the electrode outwardly whereby the current in the electrode is evenly distributed.

In testimony whereof I affix my signature in presence of two witnesses.

CONSTANTIN DE SEDNEFF.

Witnesses:
 LUCIEN MEMMINGER,
 MIGUEL FEROLO.